Dec. 12, 1961 M. SCHMIDT 3,012,431
MAIN SPRING AND BRIDLE TORQUE GAUGE
Filed May 11, 1959 2 Sheets-Sheet 1
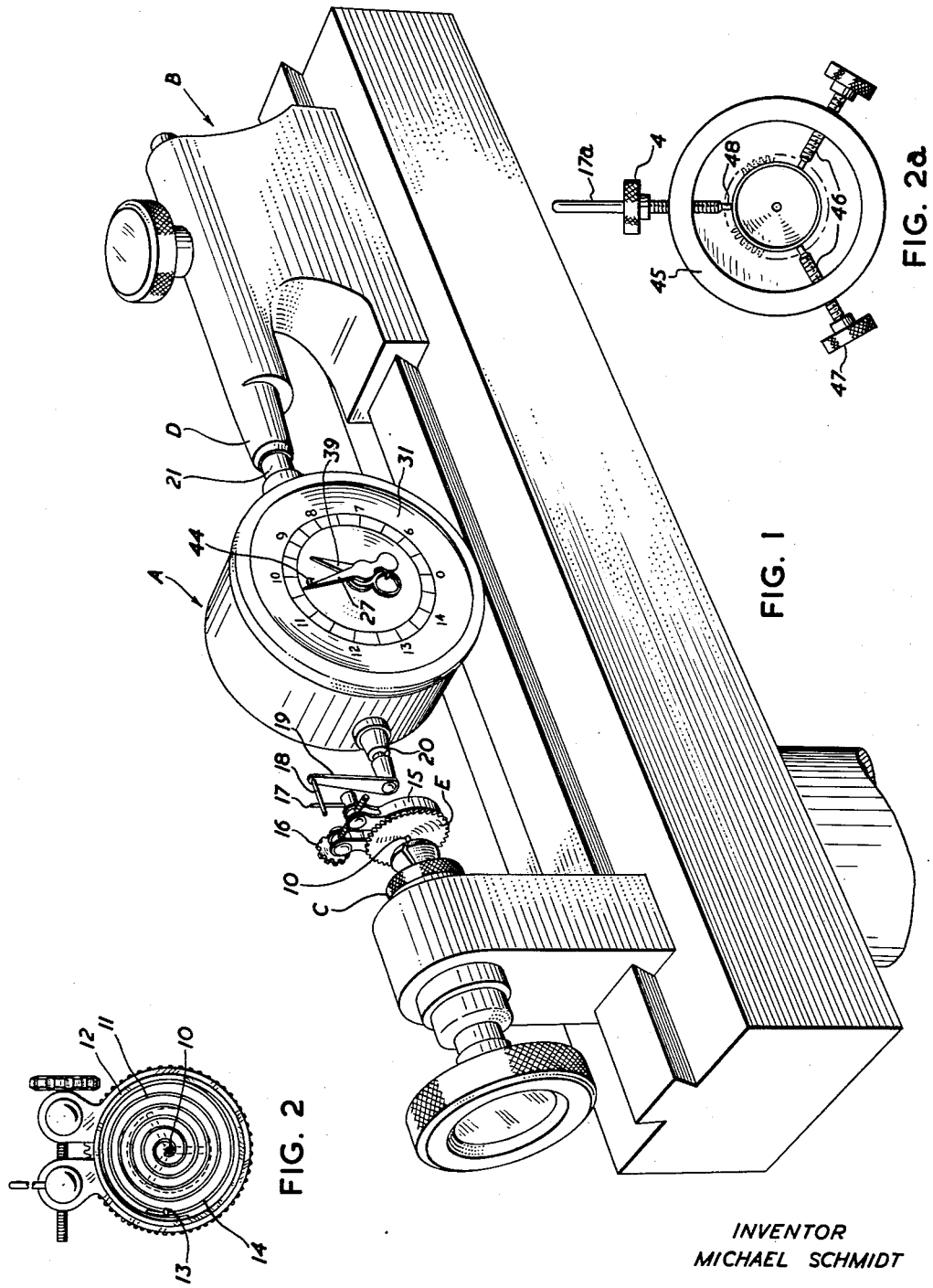
INVENTOR
MICHAEL SCHMIDT
BY: Featherstonhaugh & Co
ATTORNEYS Dec. 12, 1961  M. SCHMIDT  3,012,431
MAIN SPRING AND BRIDLE TORQUE GAUGE
Filed May 11, 1959  2 Sheets-Sheet 2
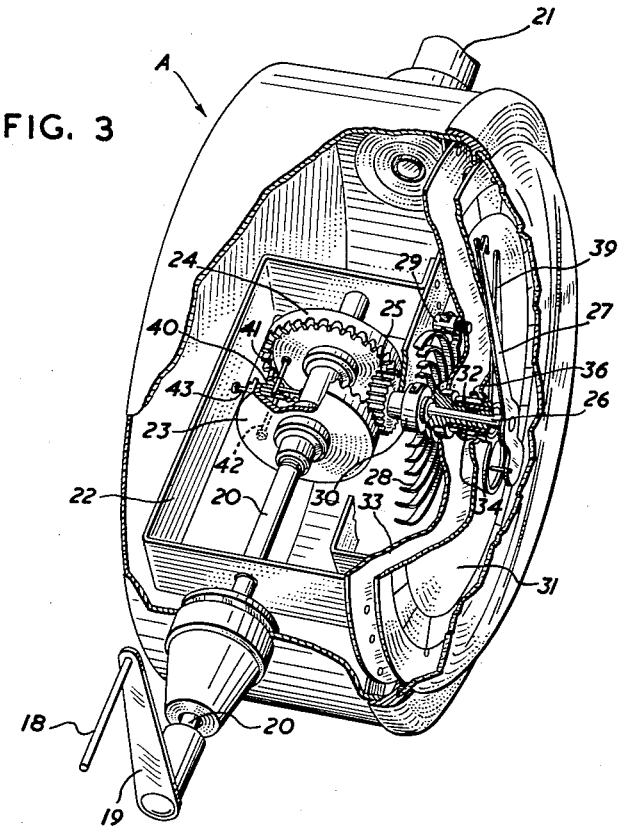
FIG. 3
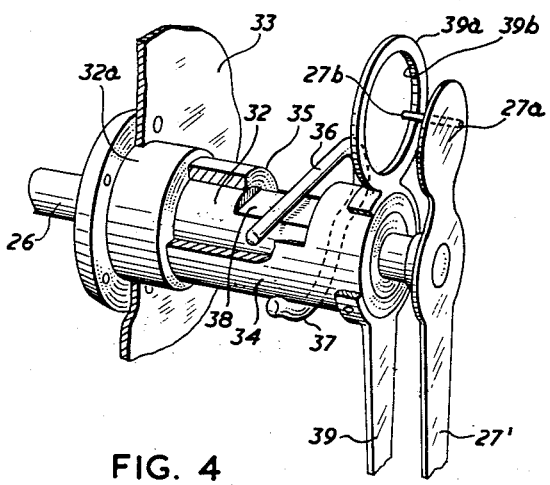
FIG. 4
FIG. 5
INVENTOR
MICHAEL SCHMIDT
BY: Featherstonhaugh & Co
ATTORNEYS

United States Patent Office 3,012,431
Patented Dec. 12, 1961

3,012,431
MAIN SPRING AND BRIDLE TORQUE GAUGE
Michael Schmidt, 12 Wellington St., Leamington,
Ontario, Canada
Filed May 11, 1959, Ser. No. 812,338
9 Claims. (Cl. 73—1)

This invention relates to a main spring and bridle torque gauge.

In automatic winding watches, it is of paramount importance that the main spring and the bridle spring assembly should be matched accurately as not only to achieve accuracy of time keeping but also to avoid stoppage of the watch movement which might otherwise occur when it is not on the wearer's arm, as well as to avoid possible breakage of the main spring and to avoid strain on the automatic winding mechanism. It has been more usual up to the present time to match these springs by the judgment of the horologist and through consulting charts. It has, however, previously been proposed, though not widely known, to provide a gauge for measuring the strength of the main spring of watch and clock movements and while this function can be accomplished, the apparatus employed has been of rather complicated construction achieving a testing of the main spring barrel assembly by imposing the spring value of the gauge spring on the spring barrel assembly of the watch movement so that the apparatus thus employed is not of versatile character as to be applicable to main springs which are wound clockwise or counterclockwise with the result that it is only applicable to one such condition. Such prior proposals contemplate the use of an apparatus as a complete unit adapted, in one case, to barrel assemblies of one type and size and, in the other, to assemblies of varying sizes but in which the barrel assembly must be held by the tester's hand against rotation as the arbor thereof is rotated by the gauge. On the one hand, a special apparatus which applies only to barrel assemblies of one type and size is obviously impracticable whereas, on the other hand, apparatus that requires the barrel assembly to be held against rotation by the tester's hand would largely be impractical because the barrel assembly is held so that it is not accurately in a plane perpendicular to the axis of rotation of the gauge or the slight forward or backward movement of the barrel assembly so held would cause binding in respect of parts of the barrel assembly and will have other detrimental effects so that the precision fine result necessary in such testing is impossible of attainment.

The present invention avoids disadvantages of prior proposals and achieves other advantages thereover by providing a simple gauge which will accurately achieve the proper correlation between the main spring and bridle spring in a simple manner and which will operate just as easily with main springs wound clockwise or counterclockwise. Moreover, it will be applied to barrel assemblies of all normal sizes of watch movements and is adapted for accurate use in conjunction with all types of watchmaker's lathes using any size of collet desired and thus is held solidly and accurately to perform the precision operation required.

The invention will be clearly understood by reference to the following detailed specification taken in conjunction with the accompanying drawings.

In the drawings:

FIG. 1 is a perspective illustration of the gauge of the present invention shown mounted in a horologist's lathe in correlation to a main spring barel assembly being tested.

FIG. 2 is a front elevation of a barrel clamp applied to a spring barrel assembly of a watch which may be employed in the present invention.

FIG. 2A is a front elevation of an alternative barrel clamp which may alternatively and preferably be employed for holding various sizes of main spring barrel assembly.

FIG. 3 is an enlarged fragmentary perspective view of the gauge with certain parts thereof broken away to show internally correlated parts thereof.

FIG. 4 is an enlarged partially fragmentary perspective view of the torque indicator assembly; and FIG. 5 is a detailed perspective view, partly in section, of part of the torque indicator assembly shown in FIG. 4.

Referring to the drawings, A indicates as a whole the gauge of the present invention which is designed to be mounted in a horologist's lathe B secured between the spindle C and the tail stock D of the lathe. The main spring barrel assembly for a watch movement which is being tested by the gauge is generally indicated by the letter E, the arbor 10 of which is clamped in a collet for the spindle by which it is clamped firmly. As shown in FIG. 2, the main spring 11 is in the normal way anchored to the arbor 10 which projects within the barrel 12, the opposite end being connected in known manner as at 13 to one end of the bridle spring 14 as employed in automatic winding watch movements, which bridle spring is tensioned as to engage the barrel 12 frictionally and is capable of slipping relatively to the barrel in the case of a fully wound main spring but which will frictionally engage the barrel against slippage when the watch is off the wearer's arm and at rest as to permit the power of the main spring to continue the operation of the watch movement.

A careful balance must be achieved between the force of the main spring and the slipping force exerted on the main spring barrel by the bridle as to assure accuracy of time keeping, to avoid possible breakage of the main spring, and proper winding of the main spring to achieve continuous power when the watch is at rest and otherwise to avoid strain on the watch movement in general. More often it has been the practice for the horologist to achieve this correlation by experienced guess-work.

In this respect not only is it necessary that a bridle spring be chosen which is correlated in strength to the main spring, but as in many cases the bridle spring is supplied as a straight leaf spring the horologist must bend the spring to introduce it to the barrel and to bend the spring to a degree to conform with the barrel as well as to match the strength of the main spring. Obviously in some cases it may be bent too much which would result in a bridle spring of weaker power than required for the particular watch spring in question so that the main spring will not wind sufficiently and the watch will probably stop when laid down at night. When not bent enough, the main spring may be caused to break by reason of the excess power of the bridle spring while the accurate regulation of the watch is impossible. Finally, in such a condition a strain on the watch movement in general is caused.

According to the present invention, the barrel assembly is secured in the collet of the spindle C as above referred to and wherein the barrel is gripped by a clamp 15 such as a strap clamp shown in FIG. 1 which may be suitably tightened by means of an adjusting screw 16 so that it is firmly connected to the barrel. The clamp includes a suitable projecting finger 17 which is disposed as to intersect the path of a pin 18 carried by the rotatable crank arm 19, the opposite end of which is connected to a rotary shaft 20 of the gauge A. This gauge is provided with a rigid arm 21 which may vary in size and construction as may be desired and is removably connected to the gauge.

This arm is designed to be rigidly fastened in the tail stock D as to hold the gauge A rigidly when so disposed. By interchanging the arm 21, the gauge may be adapted to any type of lathe which a horologist might employ.

With the gauge A rigidly clamped in this manner, the shaft 20 may be rotated to obtain a reading in relation to the barrel assembly which is being tested, it being obvious that if the barrel assembly E is caused to rotate by rotation of the lathe spindle, its finger 17 engaging the finger 18 of the crank 19 will necessarily cause the crank to rotate and thus rotate shaft 20.

As shown in FIG. 3, shaft 20 is journalled in a suitable manner such as by the framework 22 disposed within the gauge casing. The shaft 20 carries the opposed crown gears 23 and 24 which are freely rotatable thereon and designed in turn to mesh with the pinion 25 which is keyed or otherwise integrally connected with the main spring torque indicator shaft 26 which carries on the outer end thereof the main spring torque indicating needle 27. The main spring torque indicator shaft is tensioned by the spring 28, one end of which is suitably anchored as at 29 to a portion of the gauge framework, the other end being secured by a collet 30 which in turn is rigidly connected in any suitable manner to the main spring torque indicating shaft 26. This spring is gauged to create a force between the maximum reading of the scale and forces intermediate to the minimum reading of the scale which in effect, therefore, will balance the force of the spring being tested by the gauge during the testing operation. In this instance, the dial 31 is graduated as shown in FIG. 1 and the main spring torque indicating needle 27 can be caused to swing from its position of rest, zero on the scale, through the various graduations to the maximum reading on the scale but in normal practical use, the needle would usually operate between 7 and 13 of the scale which, as here shown, is the Dennison scale so graduated that the strength of the spring increases as the value on the scale decreases. Alternatively, however, the scale employed might be the metric scale wherein the strength of the spring increases as the value on the scale increases.

The shaft 26 passes through a stationary sleeve 32 which is permanently fastened by means of its hub 32a to a stationary plate 33 carried on the gauge framework. A rotatable sleeve 34 is rotatably mounted on stationary sleeve 32, the rotatable sleeve having a slot or recess 35 therein to permit the arm 36 of a spring 37 to traverse the recess and slot and to engage a flattened portion 38 of stationary sleeve 32 in a spring clamping engagement. The rotatable sleeve 34 carries on its outer end the maximum torque indicating needle or pointer 39. Both the main spring torque indicating needle 27 and the maximum torque indicating needle are provided with the diametrical extending extensions 27a and 39a respectively, the extension 27a having a suitable pin 27b projecting perpendicularly therefrom in such a manner that it will be caused to engage the extension 39a of needle 39 and to cause this latter needle in one phase of operation to move with needle 27. This may be accomplished in any suitable manner but preferably by forming the extension 39a as a ring into which the pin 27b of needle 27 projects.

The shaft 20 carries an actuating pin or finger 40 which projects transversely therefrom between the crown gears 23 and 24 and which carry respectively the fingers or pins 41 and 42 which project perpendicularly outward from their inner faces to traverse the path of pin 40. The shaft 20 may be rotated in a clockwise or counterclockwise direction and when rotated in a clockwise direction, the finger 40 of shaft 20 will engage pin 41 and crown gear 24 as to cause this gear to rotate and consequently actuate the pinion 25. Conversely, when rotated in a counterclockwise direction, the pin 40 will engage the finger 42 of crown gear 23 and thus rotate the pinion 25 in the same direction as to cause identical actuation of the indicating needles of the gauge, i.e. a rotation in a clockwise direction. A stop finger 43 carried on the frame part 22 also traverses the path of the pins 41 and 42 as to stop rotation at their full extent of movement. The gear ratio is so chosen that the crown gears 23 and 24 only go through a partial revolution sufficient to produce the full scale readings desired. Accordingly, it will be clear that the gauge is adapted to test clockwise or counterclockwise wound main springs of a spring barrel assembly.

The flattened portion 38 of stationary sleeve 32 is engaged by the arm 36 of spring 37 when the needles 27 and 39 are in alignment with one another at zero reading. In this position, the pin 27b engages the leading side 39b of the ring 39a. Therefore, when the shaft 26 is caused to rotate by the pinion 25 actuated either by crown gear 23 or 24 in the testing of a spring barrel assembly, later referred to in detail, it will be apparent that the needle 27 by means of pin 27b will cause the needle 39 to move with it. In doing this, the arm 36 of spring 37 slips from the flattened portion 38 of stationary sleeve 32 and will ride on the cylindrical portion thereof. However, when the position of maximum torque has been indicated by both the main spring torque indicator 27 and the maximum torque indicator 39 and the shaft 26 is rotated reversely to a slight degree, the balance of spring 28 against the main spring being tested will cause the main spring torque indicator to move to a reading indicating the torque of the main spring being tested. However, the maximum torque indicating needle 39 will remain approximately at the reading of maximum torque which in fact indicates the torque of the bridle spring 14. When this reading has been taken and the shaft 26 is reversely rotated to unwind the spring being tested, the pin 27b engaging the opposite side of ring 39a will cause the latter to return back to normal or zero position on the dial along with the main spring torque indicator needle 27 and when the arm 36 of spring 37 over-rides the edge of the flattened portion 38 of stationary sleeve 32, it will snap into position fully engaging this flattened surface and will correlate the maximum torque indicating needle 39 in registry with the main spring torque indicator 27.

In a majority of cases, the main spring arbor of a main spring barrel assembly must be wound 5½ to 6 turns to achieve the maximum period of operation of the watch movement in which it may be incorporated. This is so whether or not the watch movement is of the standard or automatically winding character. Otherwise, if more turns were required, the spring would be too weak and conversely if less turns were required, the spring would be too strong. Consequently, in testing a spring barrel assembly with the gauge of the present invention, the first step is to rotate the lathe spindle to which the arbor of the spring barrel assembly E is secured through between 5½ to 6 turns to achieve full winding of the main spring. This will cause the shaft 20 partially to rotate by reason of the engagement of the finger 17 of clamp 15 with the pin 18 of crank 19, the extent of movement of the crank and consequently the shaft 20 being proportional to the strength of the main spring of the barrel assembly E and the balancing spring 28 of the gauge. The strength of the spring of the barrel assembly E will consequently be indicated on the dial 31 by both needles 27 and 39, but in certain cases there will be a slight acceleration of both needles at the point where the main spring being tested is fully wound and the bridle spring takes over which indicates immediately to the tester that there is some difference between the strength of the main spring and the bridle spring. Upon reversing the lathe spindle slightly, the extent of this difference will be shown on the gauge.

The horologist has available to him a chart showing the various strengths of bridle springs and main springs relative to each particular type of movement. However, in installing the bridle spring in the barrel assembly, the spring might be distorted to a greater degree than necessary, thus to produce a weak condition of bridle spring and conversely might not distort it sufficiently as to exert too much pressure and create a condition where the bridle spring action is too strong, and which latter condition might also be simulated by improper oiling. Furthermore, the technician might rely on his judgment without consulting the chart and incorporate a spring which was slightly too weak or slightly too strong for the main spring with which it is associated. Alternatively, even though either the bridle spring or the main spring may be of proper dimensions according to the chart, they may be made of an inferior material which would not measure up to its proper torque requirements in terms of the chart. The gauge of the present invention immediately discloses unbalanced conditions for any cause of this nature. In a normal installation, the bridle spring will be very slightly higher in torque resistance of not more than one fifth of one strength than the main spring. Assume, therefore, that the torque resistance of the bridle spring is 11 on the gauge and the torque resistance of the main spring is one-fifth of a strength less. When the shaft 26 of the gauge moves both indicators 27 and 39, there will be a slight acceleration of movement of these needles shortly before they reach a position opposite 11 on the gauge or in fact at a point corresponding to twelve and four-fifths and both indicating needles will then be positioned at point 11 on the gauge. In fact, even though the spindle was given more turns than the six required, the needles would remain at this point. The slight acceleration indicates to the tester that there is a slight difference between the force of the two springs and then if the lathe spindle is reversed very slightly by the operator, the main spring torque indicating needle 27 will reverse slightly and in fact move back to the point where it first accelerated. In this instance, it will be noted that in winding the main spring for testing purposes after four turns of the spindle have been made, the spring is practically wound up and during the additional two turns very little difference occurs so that when the lathe spindle is reversed slightly or even through half or a whole turn, the needle will go back to the point of acceleration because the torque resistance of the spring is substantially constant between four and six turns of winding and in balance with the spring of the gauge. Accordingly, the difference between the torque of the bridle spring and the main spring is thus shown between the two needles and in fact in order more readily to indicate a normal condition, I prefer to include on the main spring torque indicating needle 27 a safety margin indicator 44 which will indicate a normal condition if the maximum torque indicating needle 39 is within the bounds between the indicator 44 and the needle 27, abnormal conditions being indicated when the needles are more widely separated such as shown in the dial indication of FIG. 1. When the spindle is slightly reversed, as above indicated, to produce the necessary final reading on the dial, the main spring torque indicating needle moves to its proper position by reason of the balance between the main spring being tested and the spring 28 of the gauge. However, the maximum torque indicating needle 39 remains at the position of maximum torque indication by reason of the fact that the arm 36 of spring 37 in spring pressure engagement with the stationary sleeve 32 maintains it in this position. In this regard, FIG. 5 shows the manner in which arm 36 of spring 37 rides on the cylindrical portion of stationary sleeve 32 when the rotatable sleeve 34 and the shaft 26 have been rotated through an angle of approximately 90° from their zero position.

In the case of a main spring which is too weak, it will be necessary for the operator to turn the spindle more than six times before the indicator will show acceleration as above described and, of course, when the spindle is slightly reversed, there will be a reasonably wide divergence between the two indicating needles, thus indicating by both factors, i.e. the greater number of turns and the indication on the gauge, that a main spring much too weak is being employed. In the case of an overly strong spring, the gauge will indicate maximum torque without acceleration when the operator has turned the spindle less than the normal five and a half turns, and upon reversal of the spindle the main spring torque indicator hand will immediately start to return to zero and will, by reason of pin 27b, then carry the maximum torque indicator with it.

In the case of a bridle spring of markedly different strength than the main spring in the normal six turns of the spindle of the lathe, the needles when they reach 11½ on the gauge will then accelerate and move to 10½ on the gauge, whereas upon slightly reversing the spindle the main spring torque indicator 27 will move back to 11½, thus showing the condition, i.e. a bridle spring of greater torque resistance than required.

It is, of course, obvious that the gauge of the present invention may be used to test the main spring of standard watch movements as compared to automatic winding watches. Standard watch main spring acceleration would take place at high torque between five and a half and six turns and slight reversal of spindle after winding the spring to this extent by the lathe spindle would cause the main spring torque needle to move back to the point of acceleration and in this case, the maximum torque indicator is merely disregarded.

While the clamp 15 shown in FIGS. 1 and 2 will work effectively in most cases, I prefer to employ a clamp as shown in FIG. 2A which is comprised by the ring 45 of a diameter substantially greater than the diameter of the largest barrel assembly for wrist watches, which includes the screw threaded clamping pins 46 and the operating knobs 47 to cause the reduced ends 48 of the pins to engage the barrel assembly. One of the pins 46 may be of extended character to provide the pin 17a which will function similarly to pin 17 as shown in FIG. 1 to cause actuation of the crank 19 when the lathe spindle carrying the clamped barrel assembly is rotated for operation of the gauge. This type of clamp, therefore, will serve for all sizes of barrel assembly and the reduced ends of the pins will readily function to engage the barrel to one side of gear teeth which may form part of the assembly.

What I claim as my invention is:

1. A main spring and bridle torque gauge for testing the torque resistance strength of a main spring barrel assembly, said assembly consisting of a casing, a main spring within said casing and carrying a bridle spring at its outer end, and a collet attached to the inner end of the main spring and protruding from said casing, said gauge comprising a gauge spring, torque indicator means connected to said gauge spring, torque transmitting means connected to said torque indicator means whereby to impart rotary motion thereto, which rotary motion is resisted by said gauge spring, means for gripping said collet and for winding and unwinding said barrel assembly, said transmitting means including means for engaging said barrel assembly whereby the torque resulting from the winding and unwinding of said barrel assembly will cause rotation of said torque indicator means through said torque transmitting means, said torque indicator means including a first member for indicating the sum of the torques imposed on said torque indicator means against the resistance of said gauge spring when said barrel assembly is fully wound, and a second member for indicating the torque imposed on said torque indicator means against the resistance of said gauge spring by said main spring alone, said means for engaging said barrel assembly including adjustment means whereby it may engage barrel assemblies of various sizes.

2. A gauge as claimed in claim 1, in which said torque transmitting means includes means automatically operative to transmit the torque resistance strength of barrel assemblies wound in either the clockwise or counterclockwise directions.

3. A gauge as claimed in claim 1, in which said first and second indicating members comprise a pair of needles having a graduated scale associated therewith.

4. A gauge as claimed in claim 1, in which said first and second indicating members comprise a pair of needles having a graduated scale associated therewith and including means to cause said needles to move together as said barrel assembly is wound until a maximum torque reading on said scale is reached and means to retain one of said needles at said maximum torque reading while the other needle is caused to indicate decreasing torque values within a predetermined range as said barrel assembly is unwound.

5. A gauge as claimed in claim 1, in which said first and second indicating members comprise a pair of needles having a graduated scale associated therewith, means carried by one of said needles and engageable with the other needle to cause said needles to move together as said barrel assembly is wound until a maximum torque reading on said scale is reached, and means to retain said other needle at said maximum torque reading while the first needle is caused to indicate decreasing torque values within a predetermined range as said barrel assembly is unwound.

6. A gauge as claimed in claim 5, in which the means for causing said needles to move together includes a ring member on an end of one needle and a projection on the other needle disposed in the path of and located within the circumference of the ring of said ring carrying needle.

7. A main spring and bridle torque gauge for testing the torque resistance strength of a main spring barrel assembly, said assembly consisting of a casing, a main spring within said casing and carrying a bridle spring at its outer end, and a collet attached to the inner end of the main spring and protruding from said casing, said gauge comprising a gauge spring, torque indicator means connected to said gauge spring, torque transmitting means connected to said torque indicator means whereby to impart rotary motion thereto, which rotary motion is resisted by said gauge springs, means for gripping said collet and for winding and unwinding said barrel assembly, said transmitting means including means for engaging said barrel assembly whereby the torque resulting from the winding and unwinding of said barrel assembly will cause rotation of said torque indicator means through said torque transmitting means, said torque indicator means including a first member for indicating the maximum torque imposed on said torque indicator means against the resistance of said gauge spring as said barrel assembly is wound and unwound and a second member for indicating the torque imposed on said torque indicator means against the resistance of said gauge spring by said main spring whereby maximum and lesser torque values may be simultaneously recorded, said torque transmitting means including a first shaft connected to said torque indicator means, a second shaft arranged perpendicularly to said first shaft, gear means interconnecting said shafts, and actuating means to cause said first shaft always to rotate in the same direction when said barrel assembly is wound up regardless of the direction of rotation of said second shaft.

8. A main spring and bridle torque gauge for testing the torque resistance strength of a main spring barrel assembly, said assembly consisting of a casing, a main spring within said casing and carrying a bridle spring at its outer end, and a collet attached to the inner end of the main spring and protruding from said casing, said gauge comprising a gauge spring, torque indicator means connected to said gauge spring, torque transmitting means connected to said torque indicator means whereby to impart rotary motion thereto, which rotary motion is resisted by said gauge spring, means for gripping said collet and for winding and unwinding said barrel assembly, said transmitting means including means for engaging said barrel assembly whereby the torque resulting from the winding and unwinding of said barrel assembly will cause rotation of said torque indicator means through said torque transmitting means, said torque indicator means including a pair of needles having a graduated scale associated therewith and including means to cause said needles to move together as said barrel assembly is wound until a maximum torque reading on said scale is reached and means to retain one of said needles at said maximum torque reading while the other needle is caused to indicate decreasing torque values within a predetermined range as said barrel assembly is unwound, said torque transmitting means including a first shaft carrying one of said needles at one end thereof, a pinion gear mounted at the other end of said first shaft, a pair of crown gears in engagement with said pinion gear on either side thereof and coaxially and freely mounted on a second shaft arranged perpendicularly to said first shaft, pin means carried by said crown gears and engageable with pin means carried by said second shaft to cause either one of said crown gears to rotate with said second shaft, a clamp engaging said barrel assembly and carrying a pin extending therefrom in a direction parallel to the plane of the barrel assembly; said second shaft carrying crank means engageable with the pin carried by the clamp whereby the rotation of said barrel assembly causes said first and second shafts to transmit the torque resistance strength of said barrel assembly to said gauge spring.

9. A main spring and bridle torque gauge for testing the torque resistance strength of a main spring barrel assembly, said assembly consisting of a casing, a main spring within said casing and carrying a bridle spring at its outer end, and a collet attached to the inner end of the main spring and protruding from said casing, said gauge comprising a flet coil gauge spring, torque indicator means connected to said gauge spring, torque transmitting means connected to said torque indicator means whereby to impart rotary motion thereto, which rotary motion is resisted by said gauge spring, means for gripping said collet and for winding and unwinding said barrel assembly, said transmitting means including means for engaging said barrel assembly whereby the torque resulting from the winding and unwinding of said barrel assembly will cause rotation of said torque indicator means through said torque transmitting means, said torque indicator means comprising a first shaft extending perpendicularly through the centre of said gauge spring and having the inner end of said coil spring fixed thereto, a first indicator needle fixed at one end of said first shaft so as to rotate in a plane at right angles to the longitudinal axis of said first shaft, a pin fixed to said first needle adjacent one end thereof and extending therefrom towards said coil spring and parallel to the shaft, a collar freely mounted coaxially on said shaft between said first needle and the coil spring, a second indicator needle fixed to said collar so as to rotate in a plane parallel to the plane swept by said first needle, a ring carried by said second needle and adapted to engage the pin carried by the first needle whereby the rotation of said first needle through an arc greater than an arc defined by the inner diameter of said ring causes said second needle to rotate with said first needle, and spring means mounted about said collar and on a portion of said first shaft exposed by a notch in said collar for preventing said collar and second needle from rotating with said first shaft during the rotation of said first needle through an arc less than the arc defined by the inner diameter of said ring.

References Cited in the file of this patent

UNITED STATES PATENTS

| | | |
|---|---|---|
| 407,903 | Schlatter | July 30, 1889 |
| 2,589,401 | Krahulec | Mar. 18, 1952 |

OTHER REFERENCES

Publication TT–6/54–5M of John Chattillon & Sons, 85 Cliff St., New York 38, N. Y., June 1954.